United States Patent
Line et al.

(10) Patent No.: US 8,573,675 B2
(45) Date of Patent: Nov. 5, 2013

(54) REVERSE PEDESTAL SEAT

(75) Inventors: Johnathan Andrew Line, Northville, MI (US); Kendrick Alden Harper, Temperance, MI (US); John W. Jaranson, Dearborn, MI (US); Harry Zhong, Canton, MI (US); Daniel Ferretti, Commerce Township, MI (US); Khaled Ayyash, Ann Arbor, MI (US); Robert J. Sack, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 13/290,827

(22) Filed: Nov. 7, 2011

(65) Prior Publication Data

US 2013/0113257 A1    May 9, 2013

(51) Int. Cl.
  *B60N 2/06* (2006.01)
  *B60N 2/16* (2006.01)
(52) U.S. Cl.
  USPC .............. 296/65.13; 296/64; 297/344.1
(58) Field of Classification Search
  USPC ............... 296/63, 64, 65.01, 65.13, 65.14; 297/216.1, 311, 344.1, 344.11–344.13
  See application file for complete search history.

(56) References Cited

U.S. PATENT DOCUMENTS

| | | | | |
|---|---|---|---|---|
| 2,179,085 A * | 11/1939 | De Rose | | 248/394 |
| 2,596,033 A * | 5/1952 | King | | 248/422 |
| 3,448,820 A * | 6/1969 | Barth et al. | | 180/331 |
| 3,476,435 A * | 11/1969 | Hitzelberger | | 296/64 |
| 3,650,347 A * | 3/1972 | Campos | | 180/282 |
| 3,944,276 A * | 3/1976 | de Rosa et al. | | 296/65.13 |
| 4,248,480 A * | 2/1981 | Koucky et al. | | 297/473 |
| 4,281,871 A * | 8/1981 | Grittner et al. | | 296/65.13 |
| 4,565,344 A * | 1/1986 | Iwami | | 248/429 |
| 5,015,010 A * | 5/1991 | Homeier et al. | | 280/808 |
| 5,765,803 A * | 6/1998 | Graham | | 248/624 |
| 5,931,533 A * | 8/1999 | Lance | | 297/344.18 |
| 5,984,397 A * | 11/1999 | Dawson et al. | | 296/65.09 |
| 6,193,297 B1 * | 2/2001 | Vandermolen | | 296/68.1 |
| 6,293,622 B1 * | 9/2001 | Horisawa | | 297/344.1 |
| 6,318,802 B1 * | 11/2001 | Sjostrom et al. | | 297/344.1 |
| 7,255,384 B2 * | 8/2007 | Saberan et al. | | 296/65.09 |
| 7,387,327 B2 * | 6/2008 | Tencer et al. | | 296/68.1 |
| 7,434,871 B2 * | 10/2008 | Mizuma et al. | | 296/193.07 |
| 7,438,354 B2 | 10/2008 | Moffa et al. | | |
| 7,533,936 B2 * | 5/2009 | Ujimoto et al. | | 297/344.13 |
| 7,618,076 B2 * | 11/2009 | Meynet et al. | | 296/65.01 |
| 7,658,425 B2 * | 2/2010 | Paxton et al. | | 296/24.34 |
| 7,735,917 B2 * | 6/2010 | Jones et al. | | 297/216.1 |
| 8,449,011 B2 * | 5/2013 | Jaranson et al. | | 296/64 |
| 2005/0046220 A1 * | 3/2005 | Hernandez et al. | | 296/65.13 |
| 2005/0161967 A1 * | 7/2005 | Rashidy et al. | | 296/65.01 |

* cited by examiner

*Primary Examiner* — Glenn Dayoan
*Assistant Examiner* — Gregory Blankenship
(74) *Attorney, Agent, or Firm* — Vichit Chea; Price Heneveld LLP (57) ABSTRACT

A vehicle including a seat base having a first slide assembly disposed on each of first and second sides of the seat base. A first support column is disposed below the seat base and is positioned between the first and second sides of the seat base. A second support column is disposed below the second side of the seat base. A brace connects the second support column to a transmission hump of the vehicle.

19 Claims, 7 Drawing Sheets

REVERSE PEDESTAL SEAT

FIELD OF THE INVENTION

The present invention generally relates to a reverse pedestal seat, and more specifically to a reverse pedestal seat that provides exceptional that increase leg room in a vehicle cabin.

BACKGROUND OF THE PRESENT INVENTION

Seat assemblies are generally designed for vehicles to maximize comfort and provide a safe manner of transporting individuals in the vehicle.

SUMMARY OF THE PRESENT INVENTION

One aspect of the present invention includes a seat structure for a vehicle including a seat base having a first slide assembly disposed on each of first and second sides of the seat base. A first support column is disposed below the seat base and is positioned between the first and second sides of the seat base. A second support column is disposed below the second side of the seat base. A brace connects the second support column to a transmission hump of the vehicle.

Another aspect of the present invention includes a seat structure for a vehicle including a seat base having first and second sides and a slide assembly disposed thereon. A first support column is disposed below the seat base and is positioned between the first and second sides of the seat base. A second support column is disposed below the second side of the seat base. The first and second support columns include telescoping posts adapted to position the seat base at a variety of heights.

Yet another aspect of the present invention includes a seat structure for a vehicle including a seat base having first and second sides. A first support column is disposed below the seat base and is positioned between the first and second sides of the seat base. A brace operably connects the second support column to a transmission hump of the vehicle. A second support column is disposed below the second side of the seat base. The first and second support columns include telescoping posts adapted to position the seat base at a variety of heights.

These and other aspects, objects, and features of the present invention will be understood and appreciated by those skilled in the art upon studying the following specification, claims, and appended drawings.

DETAILED DESCRIPTION OF EMBODIMENTS

Figure 1:
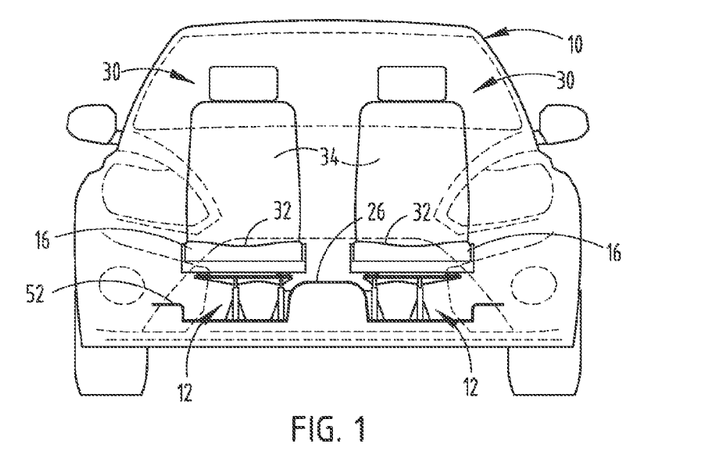
FIG. 1 is a front elevational view of a vehicle of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, reference numeral 10 generally designates a vehicle including a seat base 12 having a slide assembly 14 disposed between first and second sides 16, 18 of the seat base 12. A first support column 20 is disposed below the seat base 12 and is positioned between the first and second sides 16, 18 of the seat base 12. A second support column 22 is disposed below the second side 18 of the seat base 12. A transmission tunnel brace 24 operably connects the second support column 22 to a transmission tunnel 26 of the vehicle 10.

Figure 1A:
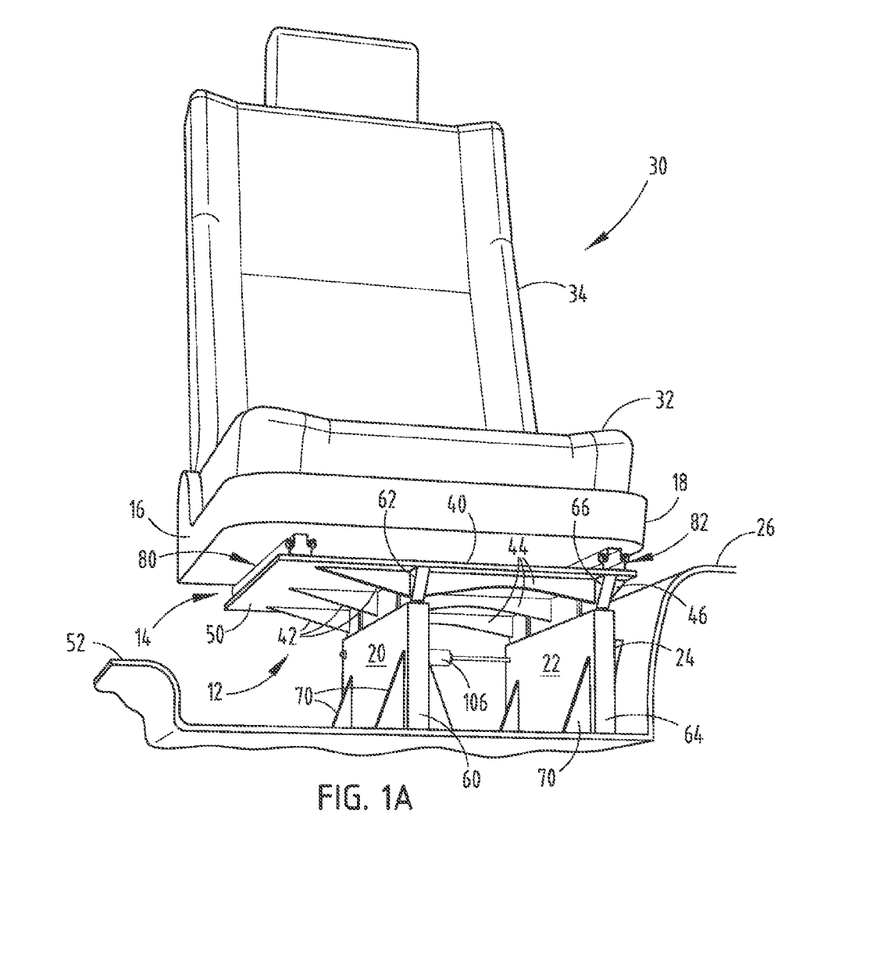
FIG. 1A is a bottom perspective view of a seat support structure of the vehicle of FIG. 1.

Referring again to the embodiment illustrated in FIGS. 1 and 1A, a seat assembly 30 is disposed above the slide assembly 14. The seat assembly 30 includes a seat 32 operably connected with a seat back 34 and rotatable relative thereto. The seat back 34 is operable between a plurality of reclined positions to provide additional comfort to a passenger. The seat assembly 30 is generally positioned over the seat base 12, as explained in further detail herein.

Figure 2:
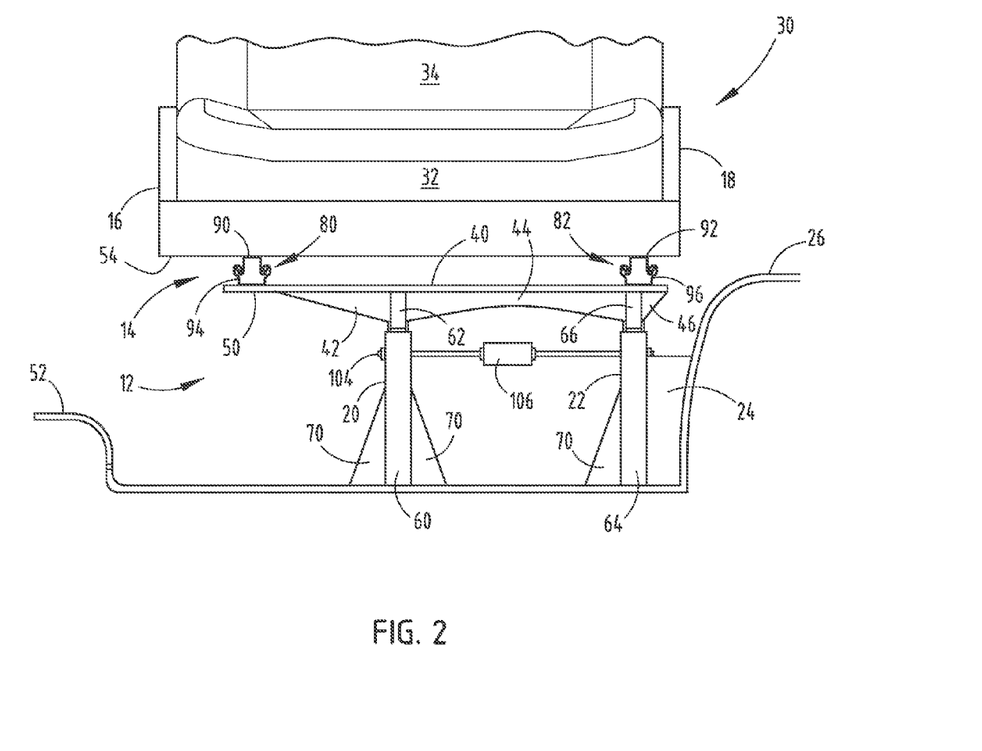
FIG. 2 is a front elevational view of the seat assembly of FIG. 1A.

Referring to FIG. 2, the seat base 12 generally includes a platform 40 upon which the seating assembly 30 is positioned. An outside web 42, an intermediate web 44, and an inside web 46 provide structural support to the platform 40. The platform 40 of the seat base 12 is positioned on the first support column 20 and second support column 22 in a laterally offset configuration such that the seat base 12 includes a cantilevered portion 50 that extends in a lateral direction toward a rocker panel 52 of the vehicle 10. The cantilevered portion 50 supports an outside edge 54 of the seat base 12. The cantilevered portion 50 may extend all the way across a bottom side of the seat assembly 30, or may be slightly recessed, as illustrated in FIG. 2. The first support column 20 is disposed below the seat base 12 and includes a first base column 60 and a first telescoping column 62 disposed therein. The first telescoping column 62 is configured to slidably move inside the first base column 60. Similarly, the second support column 22 includes a second base column 64 and a second telescoping column 66 slidably received therein.

The first telescoping column 62 and the second telescoping column 66 are configured to be secured at various heights such that the height or elevation of the seat base 12 and the seat assembly 30 generally inside the vehicle 10 can be adjusted to accommodate the size of different passengers. Each of the first support column 20 and the second support column 22 include laterally extending base webs 70 that provide stability to the first support column 20 and the second support column 22. The second support column 22 also includes the transmission tunnel brace 24 that operably connects the second support column 22 to the transmission tunnel 26 of the vehicle 10. The transmission tunnel 26 houses a transmission system that extends from a forward portion of the vehicle 10 to a rearward portion of the vehicle 10. A top end of the first support column 20 and second support column 22 is connected with the seat base 12.

Figure 3:
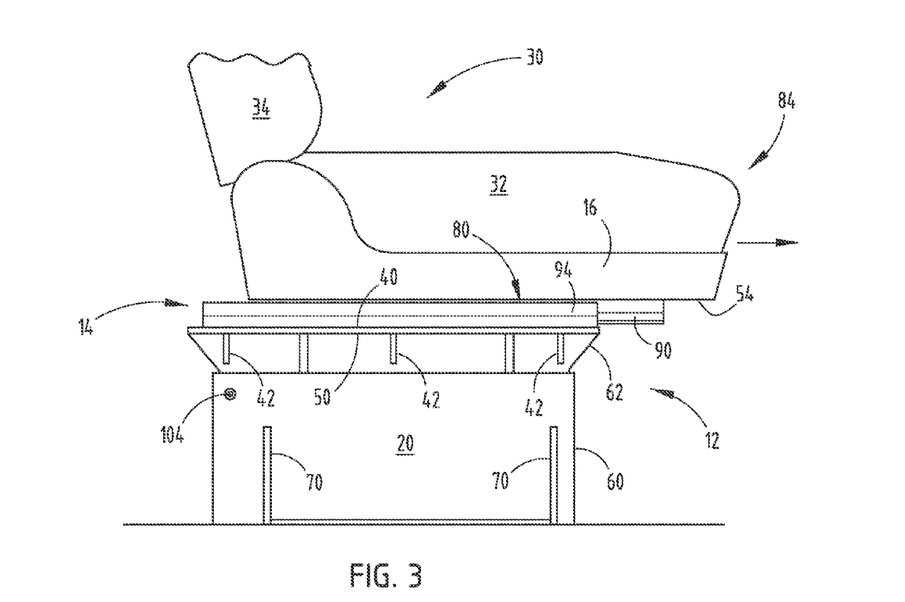
FIG. 3 is a side elevational view of the seat assembly of FIG. 1A in a forward position.
Figure 4:
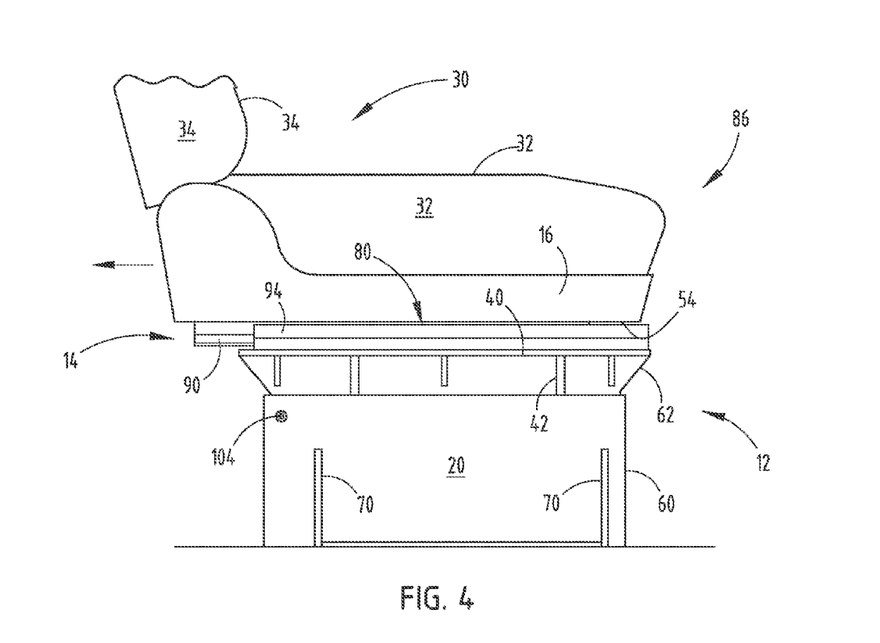
FIG. 4 is a rear perspective view of the seat assembly of FIG. 1A in a rearward position.
Figure 5:
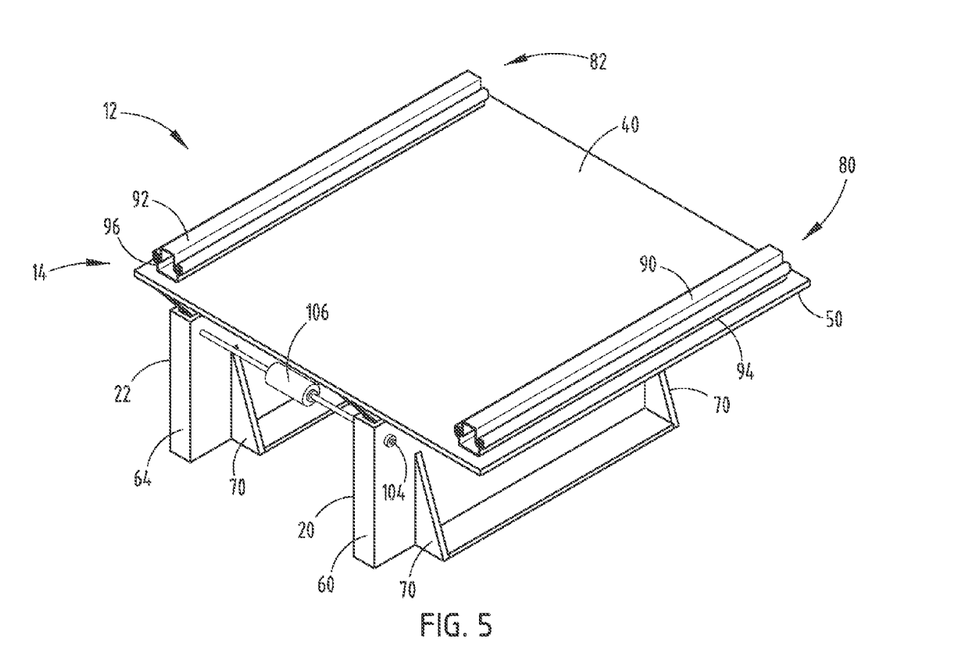
FIG. 5 is a top perspective view of the seat assembly of FIG. 1A.

Referring again to the embodiment generally illustrated in FIG. 2, the slide assembly 14 generally includes a first slide 80 disposed on the first side 16 of the seat base 12 and a second slide 82 disposed generally above the second support column 22. The first and second slides 80, 82 of the slide assembly 14 allow for linear translation of the seat 32 between a forward position 84 (FIG. 3) and a rearward position 86 (FIG. 3A). The first slide 80 includes a seat rail 90 that extends downwardly from and is fixedly attached to the seat assembly 30. Similarly, the second slide 82 includes a seat rail 92 that extends downwardly from and is fixedly attached to the seat assembly 30. In addition, the first slide 80 includes a base rail 94 fixedly attached to the seat base 12. Similarly, the second slide 82 includes a base rail 96 fixedly attached to the seat base 12. The base rails 94, 96 and the seat rails 90, 92 of the first and second slides 80, 82 include complementary constructions such that the base rails 94, 96 are slidably engaged with the seat rails 90, 92, respectively. Movement between the forward position 84 and the rearward position 86 may be done manually be a passenger or by a motorized system, as would be understood by one having skill in the art.

Figures 6, 6A:
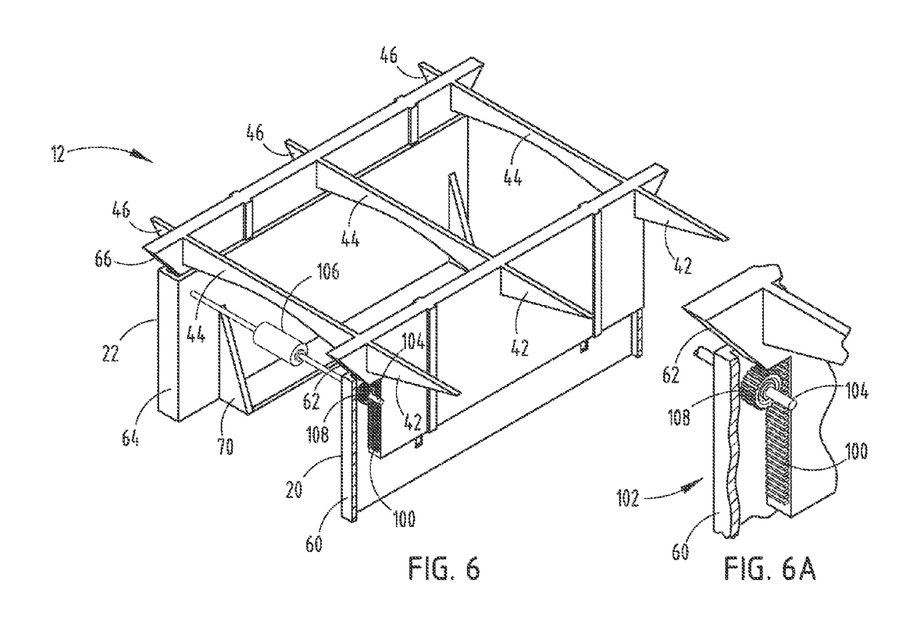
FIG. 6 is a top perspective cross-sectional view of the seat assembly of FIG. 5 with the platform removed.
FIG. 6A is an enlarged top perspective view of the gear assembly of the seat assembly of FIG. 6.
Figure 7:
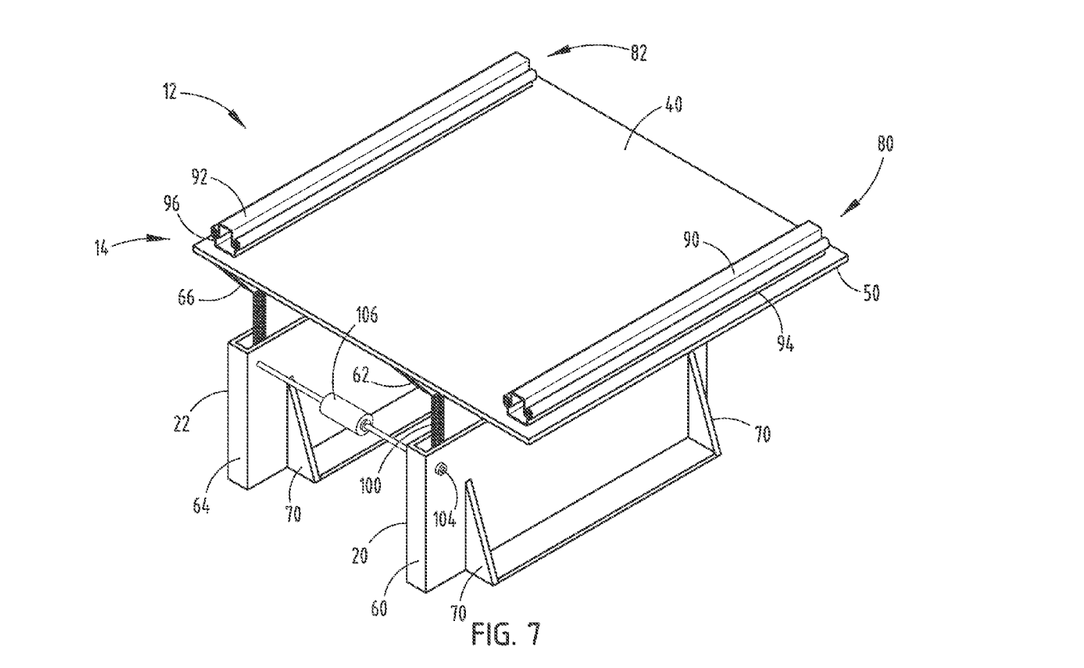
FIG. 7 is a top perspective view of the seat assembly of FIG. 5 in a raised position.
Figures 8, 8A:
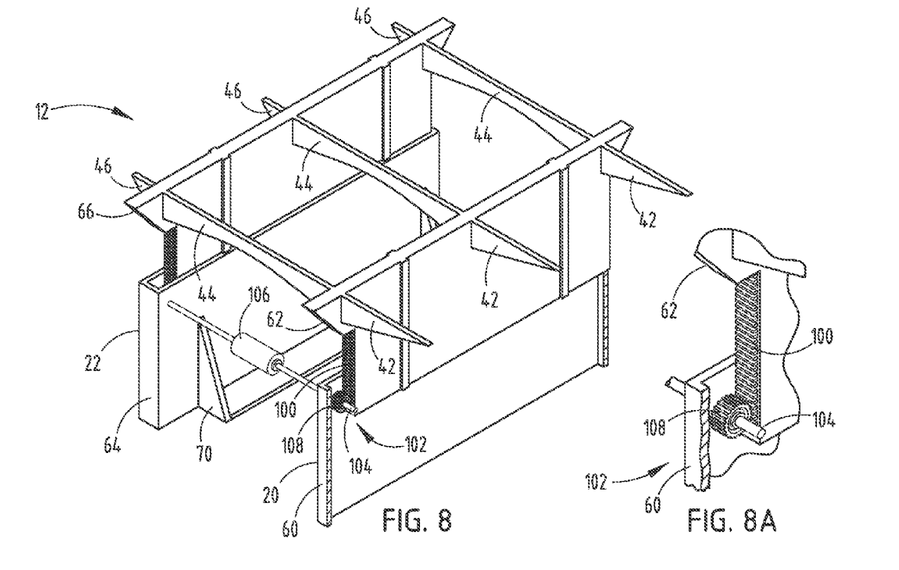
FIG. 8 is a top perspective view of the seat assembly of FIG. 5 in a raised position with the platform removed.
FIG. 8A is an enlarged top perspective view of the gear assembly of the seat assembly of FIG. 8.
Figure 9:
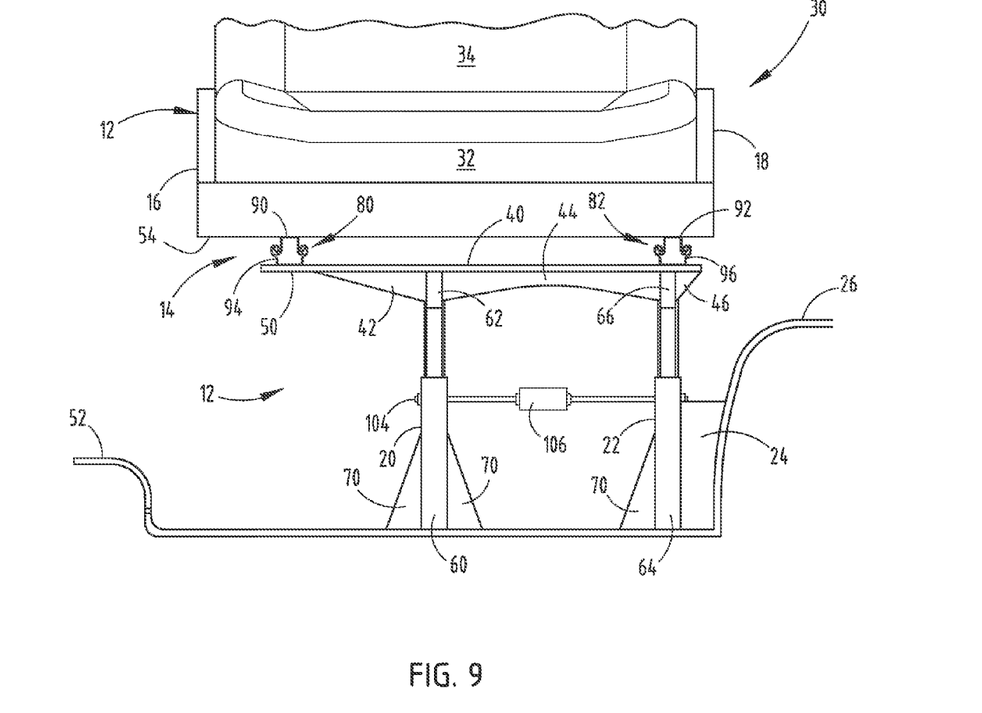
FIG. 9 is a front elevational view of the seat assembly of FIG. 2 in a raised position.
Figure 10:
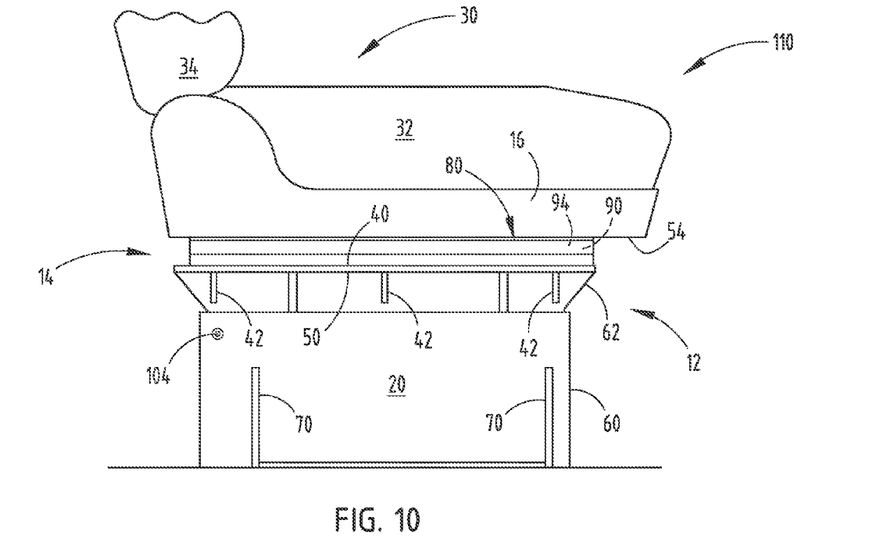
FIG. 10 is a side elevational view of one embodiment of a seat assembly in a lowered position.
Figure 11:
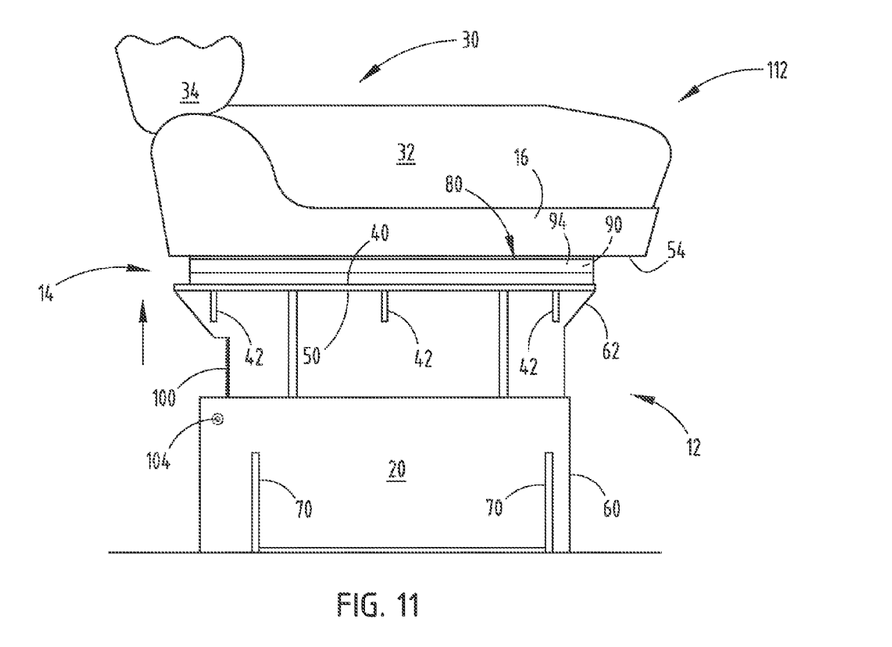
FIG. 11 is a side elevational view of one embodiment of a seat assembly in a raised position.

Referring now to FIGS. 4-6A, at least one of the first telescoping column 62 and second telescoping column 66 includes a toothed portion 100 adapted for engagement with a gear assembly 102. In the illustrated embodiment of FIGS. 5-8, only the first telescoping column 62 includes the toothed portion 100. As shown, the gear assembly 102 includes a drive shaft 104 that is in turn operably connected with a motorized system 106 adapted to turn a gear 108, which consequently moves the toothed portion 100 of the first telescoping column 62 to a lowered position 110 (FIGS. 5, 6, and 10) or a raised position 112 (FIGS. 7, 8, and 11). Rotation of the motorized system 106 in a counter-clockwise direction causes rotation of the gear 108 in a counter-clockwise direction, which causes the toothed portion 100 of the first telescoping member 62 to ascend. Conversely, rotation of the motorized system 106 in a clockwise direction causes the gear 108 to engage the toothed portion 100 of the first telescoping member 62, causing the first telescoping member 62, and consequently the seat base 12, to descend. Accordingly, the seat base 12 in its entirety can be moved between the raised position and lowered position with ease. It is also contemplated that raising and lowering of the seat assembly 30 may be done by other motorized systems or by traditional manual methods without the use of a motor. Alternatively, the seat assembly 30 may be raised or lowered by pneumatic systems or the like.

As is readily seen in FIG. 6, the monopod-type construction of the seating assembly 30 allows for increased storage space below the seat 32. The increased storage space allows for additional foot room to seated passengers positioned behind the pedestal seat. In addition, the cantilevered portion 50 of the seat base 12 provides additional room and clearance for cleaning, as well as storage between the outside rocker panel 52 of the vehicle 10 and the underside of the seat base 12. This area typically can be very difficult to reach in traditional seating assemblies.

The monotype construction explained in detail above provides a "floating" look that allows for additional foot and storage space on the vehicle 10 floor beneath the seating assembly 30. This design provides passengers with improved foot and ingress/egress clearance into and out of the vehicle 10. The system can be easily integrated into traditional seat designs without significantly modifying underseat structure. In addition, the sliding construction of the seat assembly 30 allows for adjustment of the seat 32 to accommodate different sizes of passengers. It is contemplated that the seat base 12 will include an aluminum or metal structure. However, other rigid support materials may also be used.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat structure for a vehicle comprising:
   a seat base having a slide assembly disposed on each of first and second sides of the seat base, the seat base including a cantilevered portion;
   a first support column disposed below the seat base and positioned between the first and second sides of the seat base;
   a second support column disposed below the second side of the seat base; and
   a brace connecting the second support column to a transmission hump of the vehicle.

2. The seat structure of claim 1, wherein the slide assembly includes a first slide disposed on the cantilevered portion and a second slide disposed over the second support column.

3. The seat structure of claim 1, further comprising:
   a seat back operably connected to the seat base.

4. The seat structure of claim 1, further comprising:
   an intermediate web extending between the first support column and the second support column.

5. The seat structure of claim 1, wherein the first and second support columns are fixedly attached to a floor of the vehicle.

6. The seat structure of claim 1, wherein the first support column is fixedly attached to the floor of the vehicle and the second support column is fixedly attached to the transmission hump of the vehicle.

7. The seat structure of claim 6, wherein the first and second support columns each include a telescoping member adapted to position the seat base at a variety of heights.

8. A seat structure for a vehicle comprising:
   a seat base having first and second sides and a slide assembly disposed thereon;
   a first support column disposed below the seat base and positioned between the first and second sides of the seat base; and
   a second support column disposed below the second side of the seat base, wherein the first and second support columns include telescoping members adapted to adjust a height of the seat base.

9. The seat structure of claim 8, wherein the seat base includes a cantilevered portion.

10. The seat structure of claim 9, wherein the slide assembly includes a first slide disposed on the cantilevered portion and a second slide disposed over the second support column.

11. The seat structure of claim 8, further comprising:
a seat back operably connected to the seat base.

12. The seat structure of claim 8, further comprising:
a horizontal bracket extending between the first support column and the second support column.

13. The seat structure of claim 9, wherein the first and second support columns are fixedly attached to a floor of the vehicle.

14. The seat structure of claim 8, wherein the first support column is fixedly attached to the floor of the vehicle and the second support column is fixedly attached to a transmission tunnel casing of the vehicle.

15. The seat structure of claim 14, wherein the second support column includes a brace that operably connects the second support column to the transmission tunnel casing of the vehicle.

16. A seat structure for a vehicle comprising:
a seat base having first and second sides;
a first support column disposed below the seat base and positioned between the first and second sides of the seat base;
a brace operably connecting the second support column to a transmission hump of the vehicle; and
a second support column disposed below the second side of the seat base, wherein the first and second support columns include telescoping posts adapted to position the seat base at a variety of heights.

17. The seat structure of claim 16, wherein the seat base includes a cantilevered portion.

18. The seat structure of claim 17, wherein the slide assembly includes a first slide disposed on the cantilevered portion and a second slide disposed over the second support column.

19. The seat structure of claim 16, further comprising:
a seat back operably connected to the seat base.

\* \* \* \* \*